May 20, 1969     J. C. PACCIONE     3,445,003

VACUUM FILTER WITH A RING-TENSIONED MEDIUM

Filed Oct. 7, 1966     Sheet _1_ of 2

INVENTOR.
JAMES C. PACCIONE
BY
Darbo, Robertson & Vandenburgh
ATTYS.

May 20, 1969 J. C. PACCIONE 3,445,003
VACUUM FILTER WITH A RING-TENSIONED MEDIUM
Filed Oct. 7, 1966 Sheet 2 of 2
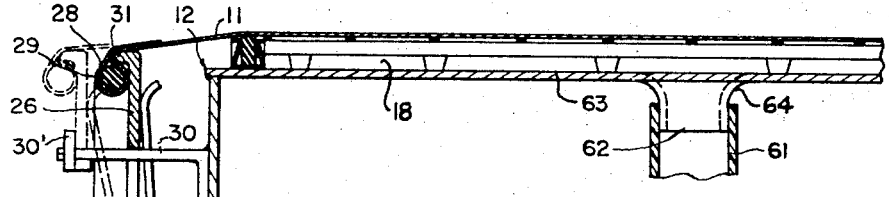
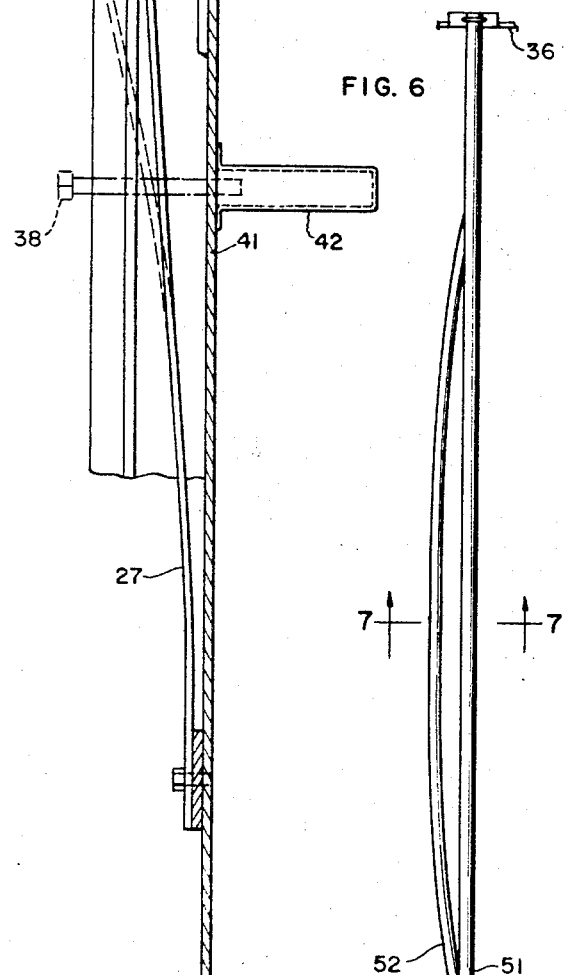
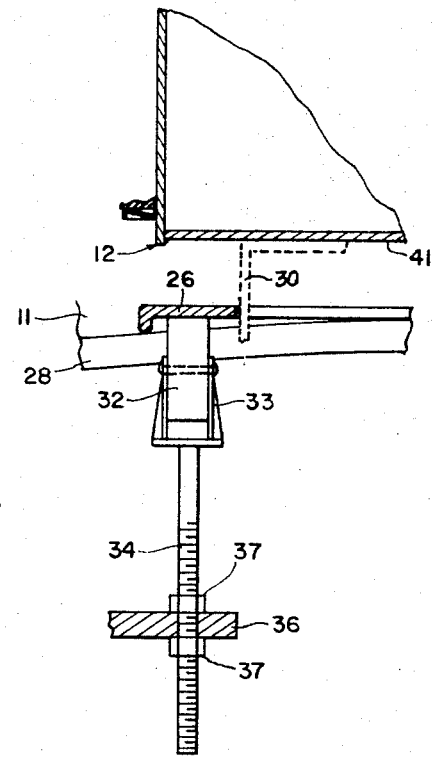
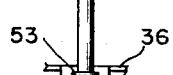
INVENTOR.
JAMES C. PACCIONE
BY
Darbo, Robertson & Vandenburgh
ATTYS.

United States Patent Office 3,445,003
Patented May 20, 1969

3,445,003
VACUUM FILTER WITH A RING-TENSIONED MEDIUM
James C. Paccione, Naperville, Ill., assignor to Chicago Bridge and Iron Company, a corporation of Illinois
Filed Oct. 7, 1966, Ser. No. 586,331
Int. Cl. B01d 25/32
U.S. Cl. 210—401                                     12 Claims

ABSTRACT OF THE DISCLOSURE

The filter medium or web of a vacuum filter commonly passes around a suction drum and is drawn away from it for removal of the filter cake, after which the web is returned to the drum. This web is maintained under transverse tension by a spring-biased tensioning ring at each end of the drum having a diameter substantially that of the drum. The web is provided along each edge with an elastomer bead which holds it on the rings, a bead riding outside of each ring. The beads are held adjacent the peripheries of the rings due to the lateral tension of the web. The ring is pushed inwardly contrary to its bias by a stationary roller in the area of departure and return of the web. The tensioning rings are supported by means which leaves them substantially friction free in the area where the web returns. Guide rollers may be provided with disks cooperating with the bead. The web may ride over a bar adjustably stretching its central area.

*Introduction*

The invention relates to vacuum filters of the type in which an endless web passes around a suction drum. More particularly, the invention relates to means for tensioning the endless web in the direction parallel to the drum axis and ensuring its proper movement.

Vacuum filters of the type indicated have been widely used for many years, for dewatering sludge such as sewage sludge. The filter drum around which the endless screen or cloth filter medium passes is partly immersed in the sludge. Suction applied to the inside of the drum draws the liquid of the sludge through the screen or cloth, forming on the outside thereof a layer of largely dewatered sludge commonly called filter cake. At a convenient point, the filter cake is continuously removed as the web passes that point, commonly being dropped onto a conveyor. The endless band is enough larger than the circumference of the drum to pass over and partly around a dumping roller, then a tensioning roller and finally a guide roller for returning the web to the drum. Many different means have been provided for applying tension and guidance to the web axially of the drum to counteract the various tendencies of the web to meander laterally, draw in, or wrinkle. Such action may expose the peripheral face of the drum, breaking the seal, and may even cause rapid destruction of the cloth. According to one aspect of the present invention, a new tensioning and guiding device is provided which is very simple and which nevertheless provides an exceptionally uniform tension. The main part of the tensioning means comprises a ring at each end of the drum, floatingly mounted, and biased by a plurality of springs away from the drum. An edging of the web along each edge is more or less hooked over the edge of the ring, and the plurality of springs provide the tension on the rings to tension and guide the web.

According to another aspect of the invention, a simple means is provided for overcoming the tendency of endless filter webs to have their center portions creepingly advanced with respect to the edges. This is accomplished by stationary but adjustable pressure and drag member bearing selectively against the intermediate portions of the web from the inside of the web.

Additional objects and advantages of the invention will be apparent from the following description and from the drawings.

*Designation of figures*

FIGURE 4 is a fragmentary sectional view, taken approximately on the line 3—3 of FIG. 2, showing especially the manner of biasing the ring and floatingly mounting it.

FIGURE 5 is a fragmentary view, approximately on the line 5—5 of FIG. 2, showing means for depressing the ring in the area of movement of the web away from the drum and then back toward it, to aid in stripping the web edging off of the tensioning ring and returning it to the tensioning ring.

FIGURE 6 is a view of the center-retarding structure, as seen from the plane 6—6 of FIG. 2.

FIGURE 7 is a vertical cross section through the structure of FIG. 6, approximately on the line 7—7 of FIG. 6.

*Background description of vacuum filters*

Figure 1:
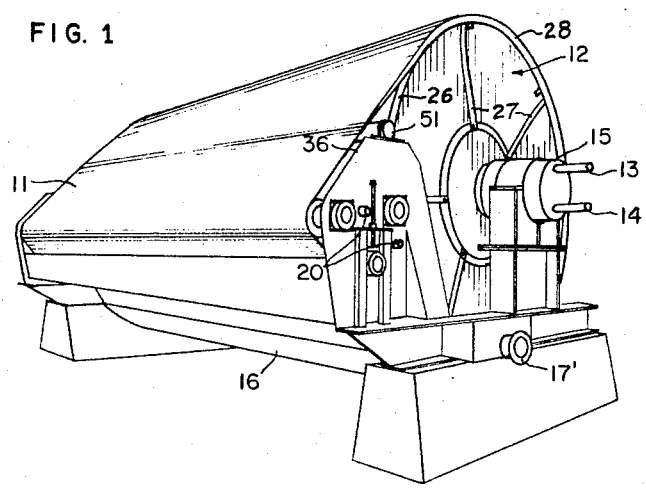
FIGURE 1 is a perspective view of a large vacuum filter made according to the present invention.

The general nature of a vacuum filter is perhaps seen best in FIGURE 1. There it can be seen that an endless web 11 of filter cloth passes around a rotating drum 12, driven by conventional means, not shown.

Figure 2:
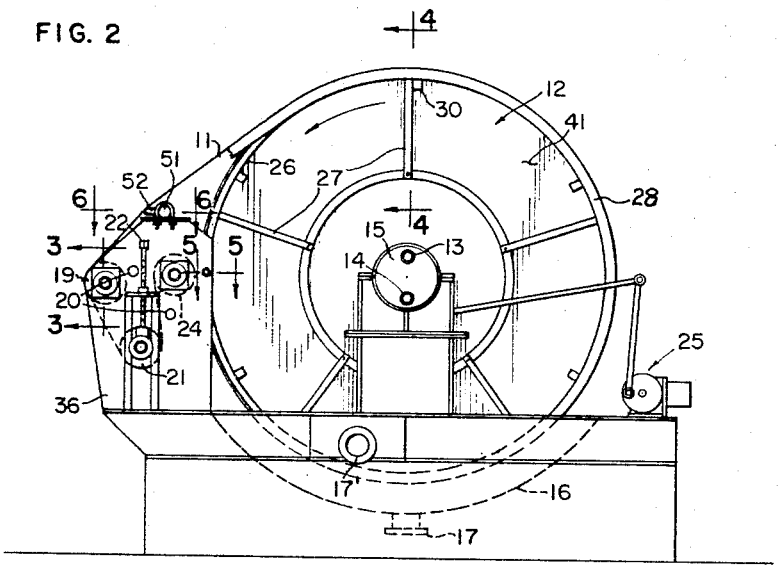
FIGURE 2 is a somewhat diagrammatic end view of the filter.

The peripheral zone of the drum is divided into a series of compartments 18 (FIG. 4), each extending nearly the axial length of the drum. Each compartment is connected to one or more pipes 61 selectively connected to suction by a rotary valve 15. When a compartment 18 is at the lower part of the drum 12 and is submerged in a vat 16 (FIG. 2) it is connected to suction pipe 14. At suitable other times it is connected to suction pipe 13. Sludge is supplied to vat 16, as by a sludge pipe 17, and may overflow at pipe 17'.

As the web passes around the lower portion of drum 12 suction applied through lower suction pipe 14 draws liquid from the sludge through the web, forming a layer of partially dewatered sludge or filter cake on the outside of the web 11. As the drum continues to rotate, the upper suction pipe 13 draws air, from above the sludge level in the vat 16 through the layer of sludge and the filter cloth to further dewater or partially dry the layer of sludge, thereby producing a filter cake which is dropped off or removed from the web 11 as the web 11 passes around a dumping roller 19. The stripping of the filter cake may be aided by a doctor blade if desired. The web then passes around a tensioning roller 21 adjusted by screws 22, passing also through water sprays from pipes 20 for washing the web. Then the web passes around a return roller 24 (unless tensioning roller 21 is suitably positioned for return). From the return roller it returns to the drum by which it is again carried down into the sludge.

It is conventional to provide an agitating unit 25 to prevent settling of sludge in vat 16.

The tension applied by tensioning roller 21 tends to cause the web to contract axially of the drum, leaving the ends of the drum exposed. To prevent this, and to keep the web centered, it has been common heretofore to provide some form of centering guide, at least some portion of which applies axial or transverse tensioning to the web 11.

*Description of present invention*

According to the present invention, the transverse tensioning is produced by tensioning rings 26, one at each end of drum 12. Each tensioning ring is urged in a direction away from the drum by leaf springs 27, which are seen in FIGURE 1, and the details of which are best seen in FIGURE 4.

Each edge of the web 11 is provided with some sort of edging 28 for engaging or hooking around the outer face of tensioning ring 26 to enable the tensioning ring to apply the transverse tension to the web. In the illustrated form of the invention, the edging comprises a beading formed by an endless elastic band 29. It may be enclosed within a hem formed along the edge of the web by folding back the edge and stitching it to the web. The elastic band may suitably be of an elastomer; natural rubber, vulcanized, being that which is now preferred. Other elastomers such as synthetic rubber, for example neoprene, can be used. However, the special characteristics for which synthetic rubbers are usually used are not particularly needed here. The band 29 may be threaded through the hem before its ends are joined by vulcanizing or other known means.

Tensioning rings 26 are floatingly mounted, being supported and guided by smooth engagement with brackets 30. With no cloth present, leaf springs 27 would press the ring forcefully against removable toe plates 30′. A tensioning force of around 10 pounds per foot of periphery of drum 12 or a little more has been found satisfactory. Hence a 6-foot diameter drum may use, for example, 5 leaf springs 27, each varying in its tensioning force from 35 to 75 pounds.

The tensioning rings 26 preferably are provided with outwardly extending flanges 31 along their peripheries, a depth at least of the order of one-half of the transverse diameter of bead 27 now being desired. The elastic bands 29 preferably have only the tension appropriate for maintaining the edge of the web hooked around the flange 31. There is less wear on the web than if greater tension of elastic band 29 caused it to contract further. Furthermore, this degree of tension allows the bands 29 to be stripped from the tensioning rings 26 with relative ease where the web leaves the drum 12 to pass around the dumping roller 19. However, as seen best in FIGURE 5, each tensioning ring is preferably depressed (pressed toward drum 12) in the zone of removal and return of the web. This is accomplished by a roller 32 which is rotatably carried by a yoke 33 which is adjustably positioned by a screw 34. The screw 34 extends through side frame 36, and is positioned with respect to it by nuts 37. Instead of depressing tensioning rings 26 to a fixed distance as illustrated, depressing rollers 32 may be spring urged, in which case the spring tension is preferably adjustable. In either event, the depressing rollers 32 overpower the leaf springs 27, or largely offset their force, to enable the edging 28 to be stripped off of flanges 31 and to return to them with a minimum of wear. Roller 32 is positioned relatively close to return roller 24 so that the edging will reliably return to tensioning ring 26. A position for roller 32 found satisfactory is one-third the distance between the point of return and the point of stripping.

To install web 11, it is preferable that some means be provided for depressing the entire of tensioning rings 26. A simple form of depressor comprises a series of screws 39, each passing through a hole in tensioning ring 26 near a leaf spring 27 and threaded end plate 41 of drum 12. A deep cap 42 is preferably secured and sealed to the inside of plate 41 and extends inwardly from end plate 41 far enough to receive the length of screw 38 required for drawing tensioning ring 26 all of the way against end plate 41. Although caps 42 could be welded to end plate 41, it is preferred that they be secured by an epoxy cement, since this has been found to be a very economical and extremely dependable type of construction.

Figure 3:
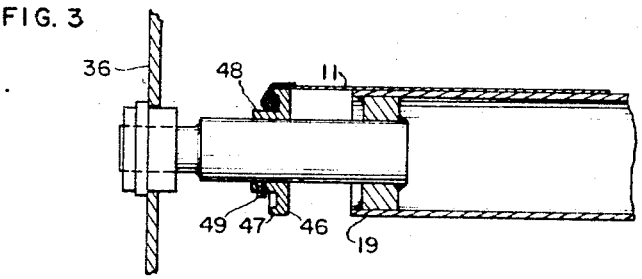
FIGURE 3 is a fragmentary view of a much smaller ring associated with one of the small rollers, for aiding in the maintenance of the axial tension of the web as it passes around the small rollers.

As seen in FIGURE 3, dumping roller 19 is provided with a guide ring 46 to maintain the tension on web 11 transversely thereof as the web 11 passes around the dumping roller 19. Guide ring 46 also preferably has a flange 47 thereon as in the case of tensioning ring 26. Guide 46 is carried by a hub 48, which may be adjusted axially and locked in its adjusted position by set screw 49. Alternatively, a spring could be used to press guide 46 outwardly. Guide 46 is preferably made of a slick-surfaced plastic such as nylon, Delrin or Teflon, (at present a cast epoxy) to ease the rubbing of the edging 28 thereon as the edging passes onto and off from guide 46.

Tensioning roller 21 and return roller 24 are each preferably provided similarly with a guide 46.

The central portion of web 11 tends to creep ahead of the edge portions. To prevent this, the structure seen best in FIGURE 6 is provided. The structure includes a bar 51, which may be a round 2 inch pipe, and which extends between the two side frames 36 as seen in FIG. 1. Bar 51 has secured to it a second bar 52, which may be a slightly bowed bar or pipe extending, for example, ⅔ of the length of the bar 51. By turning bar 51 on its axis, bar 52 may be projected further or less far into or through the natural plane of web 11 as it passes from drum 12 to dumping roller 19. When it has been turned to such an angle that it just neutralizes the tendency of a center section to creep ahead of the edge sections, it may be secured in this position by tightening U-bolts 53.

*Modifications and further description*

Although it would be hopeless to attempt to list all of the modifications that can be made, a few may be mentioned for illustration.

Instead of using leaf springs, the tensioning rings could be urged outwardly by compression coil springs. To provide sufficient force over the range of movement, they could extend through the end wall of the drum, being seated at the base of inwardly extending cups sealed to the end wall.

Tensioning rings 26 may also be biased by other means, such as hydraulic jacks, or they may, though less desirably, be adjustably set by screws, instead of being biased.

The edging means may take a wide variety of forms. There might, for example, be a multitude of hook shaped clips, with hook shaped portions extending outwardly to hook around flanges 31, and the shank portion secured to the filter cloth, or other filter medium, by deformable cleats formed thereon or by separate stitches or staples or the like.

If a cloth should be developed that does not change much with age, adjustability of the guides 46 on the smaller rollers 19, 21 and 24 may be found to be unnecessary. In fact, if the rollers are extended, their ends, which lie in planes perpendicular to the axis, would provide axially facing shoulders against which the bead or elastomer band 29 could bear. In theory, drum 12 could then be similarly treated, but at present movable tensioning rings are very important in practice, to take up the cloth as it gradually stretches. Resilience in their positioning is at present much preferred to a fixed adjustment. If a fixed adjustment is used some means for aiding stripping and return of the elastomer band 29 may be found to be desirable, such as fixed cams or rollers.

Pipes 61 within the drum (which lead from valve 15 to the conventional separate suction compartment) are secured and sealed by epoxy cement. In that instance an epoxy compound which remains pliable is preferred. The 3M compound No. 2216 A and B has been found suitable. It includes an epoxy base with a modified amine and Thiokol.

The pipes 61 may then be cemented to nipples 62 formed by reshaping the stainless steel decking or shell 63. The reshaping can be accomplished by drawing, as by driving the metal surrounding a suitable hole into a female die with a ball-shaped plunger. Preferably a large radius at 64 (for example ¾ inch) is provided to give smooth flow characteristics for the liquid entering pipe 61. At present pipe 61 (or a coupler collar thereon) is cement on the outside of nipple 62 to give the best entry hydraulic conditions. If pipes 61 are cemented inside the nipples, they should be internally shaped to continue the entry curvature. Using a formed nipple not only reduces frictional loss but also avoids the warpage of the shell which has heretofore occurred in welding couplings to it. The pipes 61 are preferably plastic, e.g. P.V.C. Leaks are more rare than with welding and more easily repaired. Epoxy cement is also used for securing the tube plate to the end of the housing of valve 15.

Achievement

By use of the present invention the filter cloth can be held in virtually ideal condition on the drum of the vacuum filter, the added structure for accomplishing this being of moderate cost and of trouble free nature.

It might seem that the friction of a heavy steel ring 26 on support brackets 30 would be so great that the resilient tensioning could not work properly. This is not the case. Ring 26 is oversize in its diameter so that it tends to rest on the top one or two brackets 30 and hang free from the others. The spring action occurs mainly in the lower half of the cycle, where movement is completely free. At the top it is enough for the ring 26 to remain stationary and hold the tension already established.

Because elastomer band 29 always bears against flange 31 no unpredictable variation of web tension is introduced, as would be the case if elastomer 29 contracted inwardly. The variation in leaf springs 27 is fully predictable.

I claim:

1. A vacuum filter including a suction drum, a filter medium in the form of an endless web passing around said drum and around rollers separate from said drum, and means for transversely tensioning said web including a tensioning ring at the end of the drum of approximately the same diameter as the drum, and shiftable axially with respect to the drum, means along the edge of the web for strippably securing the edge of the web to the ring, and means applying a force to the ring in a direction away from the drum for maintaining transverse tension on the web.

2. A vacuum filter including a suction drum, a filter medium in the form of an endless web passing around said drum and around rollers separate from said drum, and means for transversely tensioning said web including a tensioning ring at the end of the drum of approximately the same diameter as the drum, and shiftable axially with respect to the drum, means along the edge of the web for strippably securing the edge of the web to the ring, with a relationship substantially unvarying when secured to the ring, and means applying a force to the ring in a direction away from the drum for maintaining transverse tension on the web.

3. A vacuum filter including a suction drum, a filter medium in the form of an endless web passing around said drum and around rollers separate from said drum, and means for transversely tensioning said web including a tensioning ring at the end of the drum of approximately the same diameter as the drum, and shiftable axially with respect to the drum, means forming an elastic bead along the edge of the web for strippably securing the edge of the web to the ring, and means applying a force to the ring in a direction away from the drum for maintaining transverse tension on the web with the elastic bead held at the periphery of the ring by said tension.

4. A vacuum filter including a suction drum, a filter medium in the form of an endless web passing around said drum and around rollers separate from said drum, and means for transversely tensioning said web including a tensioning ring at the end of the drum of approximately the same diameter as the drum, and shiftable axially with respect to the drum, means forming an elastic bead along the edge of the web for strippably securing the edge of the web to the ring, and means applying a force to the ring in a direction away from the drum for maintaining transverse tension on the web.

5. A vacuum filter including a rotary suction drum, a filter medium comprising an endless web passing around said drum and carried by it through a body of material to be filtered, a plurality of smaller rollers around which said web also passes, one of said rollers being movable in a direction to apply tension to the web in its endless direction, means for applying transverse tension to the web including a tensioning ring at each end of the drum, each ring being of approximately the same diameter as the drum and including an outwardly extending flange at its periphery, and each being movable away from the end of the drum, a continuous elastic bead associated with the web along each edge thereof for hooking the edge over the flange of said tensioning ring, a guide shoulder at each end of each of the smaller rollers adapted to engage the inside of said bead and to maintain transverse tension on the web as it passes around said rollers, resilient means to urge the tensioning rings in the direction away from the drum, and mean for depressing each ring toward the drum in the vicinity of the points of stripping of the bead from the tensioning ring and of its return to the tensioning ring.

6. A vacuum filter including a rotary suction drum, a filter medium comprising an endless web passing around said drum and carried by it through a body of material to be filtered, a plurality of smaller rollers around which said web also passes, one of said rollers being movable in a direction to apply tension to the web in its endless direction, means for applying transverse tension to the web including a tensioning ring at each end of the drum, each ring being of approximately the same diameter as the drum and including an outwardly extending flange at its periphery, and each being movable away from the end of the drum, a continuous elastic bead associated with the web along each edge thereof for hooking the edge over the flange of said tensioning ring, a guide shoulder at each end of each of the smaller rollers adapted to engage the inside of said bead and to maintain transverse tension on the web as it passes around said rollers, resilient means to urge the tensioning rings in the direction away from the drum, means for depressing each ring toward the drum in the vicinity of the points of stripping of the bead from the tensioning ring and of its return to the tensioning ring, but closer to the point of its return.

7. A vacuum filter including a rotary suction drum, a filter medium comprising an endless web passing around said drum and carried by it through a body of material to be filtered, a plurality of smaller rollers around which said web also passes, one of said rollers being movable in a direction to apply tension to the web in its endless direction, means for applying transverse tension to the web including a tensioning ring at each end of the drum, each ring being of approximately the same diameter as the drum and including an outwardly extending flange at its periphery, and each being movable away from the end of the drum, a continuous elastic bead associated with the web along each edge thereof for hooking the edge over the flange of said tensioning ring, a guide shoulder at each end of each of the smaller rollers adapted to engage the inside of said bead and to maintain transverse tension on the web as it passes around said rollers, resilient means to urge the tensioning rings in the direction away from the drum, means for depressing each ring toward the drum in the vicinity of the points of stripping of the bead from the tensioning ring and of its return to the tensioning ring; and a stationary member for deflecting the central portion of the web, where it is not in contact with the drum or rollers, adjustably from its natural plane to retard the movement thereof to prevent its creeping ahead of the edge portions of the web.

8. A vacuum filter including a rotary suction drum, a filter medium comprising an endless web passing around said drum and carried by it through a body of material to be filtered, a plurality of smaller rollers around which said web also passes, one of said rollers being movable in a direction to apply tension to the web in its endless direction, means for applying transverse tension to the web including a tensioning ring at each end of the drum, each ring being of approximately the same diameter as the drum and including an outwardly extending flange at its periphery, and each being movable away from the end of the drum, a continuous elastic bead associated with the web along each edge thereof for hooking the edge over the flange of said tensioning ring, a guide shoulder at each end of each of the smaller rollers adapted to engage the inside of said bead and to maintain transverse tension on the web as it passes around said rollers, resilient means to urge the tensioning rings in the direction away from the drum, means in the vicinity of the points of stripping of the bead from the tensioning ring and of its return to the tensioning ring to aid said stripping and return, and a stationary member for deflecting the central portion of the web, where it is not in contact with the drum or rollers, adjustably from its natural plane to retard the movement thereof to counteract its tendency to creep ahead of the edge portions of the web.

9. A vacuum filter including a suction drum, a filter medium in the form of an endless web passing around said drum and around rollers separate from said drum, and means for transversely tensioning said web including a tensioning ring at the end of the drum of approximately the same diameter as the drum, and shiftable axially with respect to the drum, means along the edge of the web for strippably securing the edge of the web to the ring, and means applying a force to the ring in a direction away from the drum for maintaining transverse tension on the web; and means for counteracting the tendency for the central portion of the web to creep ahead of the edges thereof.

10. A vacuum filter according to claim 9 in which the counteracting means comprises means for applying a frictional drag to the central portion of the web.

11. A vacuum filter according to claim 9 in which the counteracting means comprises a bow-shaped member adjustable to bear increasingly on the web for applying a frictional drag to the central portion of the web.

12. A vacuum filter including a suction drum, a filter medium in the form of an endless web passing around said drum and around rollers separate from said drum, and means for transversely tensioning said web including a tensioning ring at the end of the drum of approximately the same diameter as the drum, and shiftable axially with respect to the drum, means along the edge of the web for strippably securing the edge of the web to the ring, and means applying a force to the ring in a direction away from the drum for maintaining transverse tension on the web; support means for the tensioning ring outstanding from the drum and extending internally of the ring, and said ring being oversize in its internal diameter as to the diametric positioning of said outstanding means to hang freely on its lower side where the returning web is adjusted to the drum.

References Cited

UNITED STATES PATENTS

| | | | |
|---|---|---|---|
| 749,210 | 1/1904 | Massey et al. | 285—238 |
| 2,498,831 | 2/1950 | Veitch | 285—286 |
| 3,129,020 | 4/1964 | Bujnowski | 285—238 X |
| 3,143,502 | 8/1964 | Krynski | 210—401 |
| 3,289,848 | 12/1966 | Miles | 210—401 X |

REUBEN FRIEDMAN, *Primary Examiner.*

T. A. GRANGER, *Assistant Examiner.*